(12) United States Patent
Kavantzas et al.

(10) Patent No.: US 8,726,349 B2
(45) Date of Patent: May 13, 2014

(54) OPTIMIZING INTERACTIONS BETWEEN CO-LOCATED PROCESSES

(75) Inventors: Nickolas Kavantzas, Emerald Hills, CA (US); Pratibha Gupta, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 72 days.

(21) Appl. No.: 13/118,940

(22) Filed: May 31, 2011

(65) Prior Publication Data

US 2012/0131641 A1 May 24, 2012

Related U.S. Application Data

(60) Provisional application No. 61/417,173, filed on Nov. 24, 2010.

(51) Int. Cl.
*H04L 29/06* (2006.01)

(52) U.S. Cl.
USPC .................. 726/3; 726/1; 726/22; 726/29

(58) Field of Classification Search
None
See application file for complete search history.

(56) References Cited

U.S. PATENT DOCUMENTS

| | | | |
|---|---|---|---|
| 6,516,416 B2 | 2/2003 | Gregg et al. | |
| 7,197,741 B1 | 3/2007 | Stapf | |
| 7,290,288 B2 | 10/2007 | Gregg et al. | |
| 7,424,702 B1 | 9/2008 | Vinodkrishnan et al. | |
| 7,725,605 B2 | 5/2010 | Palmeri et al. | |
| 8,560,819 B2 | 10/2013 | Fillipi et al. | |
| 2004/0103046 A1 | 5/2004 | Christoph et al. | |
| 2006/0053120 A1 | 3/2006 | Shum et al. | |
| 2006/0075465 A1* | 4/2006 | Ramanathan et al. | 726/1 |
| 2006/0206440 A1 | 9/2006 | Anderson et al. | |
| 2006/0230430 A1* | 10/2006 | Hondo et al. | 726/1 |
| 2008/0148345 A1 | 6/2008 | Rubio | |
| 2008/0189760 A1 | 8/2008 | Rosenberg et al. | |
| 2009/0099860 A1* | 4/2009 | Karabulut et al. | 705/1 |
| 2009/0099882 A1* | 4/2009 | Karabulut | 705/7 |
| 2009/0125612 A1* | 5/2009 | Rabetge et al. | 709/220 |
| 2010/0030890 A1 | 2/2010 | Dutta et al. | |
| 2010/0064184 A1 | 3/2010 | Almeida et al. | |
| 2010/0077455 A1 | 3/2010 | Nishio et al. | |

(Continued)

OTHER PUBLICATIONS

Non Final Office Action for U.S. Appl. No. 13/149,065 (Dec. 4, 2012).

(Continued)

*Primary Examiner* — Jeffrey Williams
(74) *Attorney, Agent, or Firm* — Kilpatrick Townsend & Stockton LLP

(57) ABSTRACT

In one set of embodiments, methods, systems, and apparatus are provided to enable secure local invocation of a web service in response to receiving a request from a first composite application to invoke a web service operation of a second composite application, where the first application is associated with a reference policy, and the second application is associated with a service policy, then determining, based upon the service policy and the reference policy, whether local invocation is secure, and invoking the operation using the local invocation in response to determining that the local invocation is secure. Attributes associated with the reference and service policies can indicate whether those policies can be used in a local invocation, or if user authentication is needed before performing the invocation with those policies. The local invocation may comprise a procedure call in an application server from the first application to the second application.

18 Claims, 9 Drawing Sheets

(56) References Cited

U.S. PATENT DOCUMENTS

| | | | |
|---|---|---|---|
| 2010/0115075 A1 | 5/2010 | Chen et al. | |
| 2010/0153695 A1* | 6/2010 | Bussard et al. | 713/1 |
| 2010/0269148 A1 | 10/2010 | Almeida et al. | |
| 2011/0035650 A1* | 2/2011 | Jardine-Skinner et al. | 715/205 |
| 2011/0047451 A1 | 2/2011 | Jardine-Skinner et al. | |
| 2011/0131275 A1* | 6/2011 | Maida-Smith et al. | 709/204 |
| 2012/0054496 A1 | 3/2012 | Abeln et al. | |
| 2012/0110093 A1 | 5/2012 | Tingstrom et al. | |
| 2012/0131164 A1 | 5/2012 | Bryan et al. | |
| 2012/0216100 A1* | 8/2012 | Jardine-Skinner et al. | 715/205 |

OTHER PUBLICATIONS

Bajaj et al. "Web Services Policy Framework (WS-Policy)" Version 1.2, BEA Systems, Inc. (Mar. 2006).

Christensen et al. "Web Services Description Language (WSDL)" version 1.1, World Wide Web Consortium (Mar. 2001).

Phan et al. "Quality-Driven Business Policy Specifications and Refinement for Service-Oriented Systems," Proceedings of the 6th International Conference on Service-Oriented Computing (ICSOC 2008) 5364:5-21 (2008).

Shute, et al., "DataPower SOA Appliance Service Planning, Implementation, and Best Practices," IBM Redbook, SG24-7943-00, Jun. 28, 2011.

Nordbotten, N. A., "XML and Web Services Security Standards," Communications Surveys & Tutorials, IEEE, vol. 11, No. 3, pp. 4,21, 3rd Quarter 2009.

Final Office Action for U.S. Appl. No. 13/149,065 (Jul. 3, 2013), 20 pages.

Non Final Office Action for U.S. Appl. No. 13/436,940 (Jul. 15, 2013), 30 pages.

Notice of Allowance for U.S. Appl. No. 13/149,049 (Sep. 17, 2013) 10 pages.

Notice of Allowance for U.S. Appl. No. 13/149,037 (Oct. 8, 2013) 7 pages.

Notice of Allowance for U.S. Appl. No. 13/118,944 (Oct. 10, 2013) 9 pages.

Notice of Allowance for U.S. Appl. No. 13/118,876 (Jun. 12, 2013) 8 pages.

Non Final Office Action for U.S. Appl. No. 13/149,037 (May 1, 2013), 8 pages.

Non Final Office Action for U.S. Appl. No. 13/118,944 (May 16, 2013), 30 pages.

Non Final Office Action for U.S. Appl. No. 13/149,049 (Mar. 5, 2013). 14 pages.

\* cited by examiner

OPTIMIZING INTERACTIONS BETWEEN CO-LOCATED PROCESSES

RELATED APPLICATIONS

This application claims the benefit and priority under 35 U.S.C. 119 (e) of U.S. Provisional Application Ser. No. 61/417,173, filed Nov. 24, 2010, entitled A METHOD FOR OPTIMIZING THE INTERACTIONS BETWEEN CO-LOCATED PROCESS ORIENTED COMPOSITE APPLICATIONS, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 13/149,037 entitled Identifying Compatible Web Service Policies;
(2) U.S. application Ser. No. 13/149,049 entitled Propagating Security Identity Information to Components of a Composite Application;
(3) U.S. application Ser. No. 13/149,065 entitled Nonconforming Web Service Policy Functions;
(4) U.S. application Ser. No. 13/118,944 entitled Runtime Usage Analysis for a Distributed Policy Enforcement System.
(5) U.S. application Ser. No. 13/118,947 entitled Attaching Web Service Policies to a Group of Policy Subjects.

BACKGROUND

Embodiments of the present invention relate generally to interaction between applications in computer systems, and more particularly to techniques that enable efficient interaction between applications that can have quality of service constraints.

Information technology provides automated systems to meet the needs of organizations, but factors such as the complexity of the systems, changing markets, increasing competitive pressures, and evolving customer needs are creating demand for more flexible and efficient systems. A standardized approach to designing and building enterprise applications, known as Service Oriented Architecture (SOA), has been introduced to meet this demand. SOA facilitates the development of enterprise applications as modular web services that can be easily integrated and reused. SOA defines how the services interact, so that different applications can be integrated. Applications can communicate with the services via Web protocols such as HTTP. SOA defines service interfaces in terms of protocols and features. Applications can invoke services by exchanging messages, e.g., a request message from the application to a server that implements the service, and a response message from the server back to the application after executing the service. Services can also be invoked by other services. Messages can be sent and received via channels, e.g., network connections. A "binding" establishes the connection between an SOA composite application and the external world. There are two types of binding components: services, which provide the outside world with an entry point to the SOA composite application and describe the protocols that can communicate with the service (for example, SOAP/HTTP or a JCA adapter), and references, which enable messages to be sent from the SOA composite application to external services in the outside world. Services use "endpoints" to access the channels and send/receive messages. An endpoint is an association between a binding and a network address that may be used to communicate with a service. Thus an endpoint indicates a specific address for accessing a service using a specific protocol and data format.

Each service provides an operation, such as a bank account deposit. An application or another service calls an appropriate Application Programming Interface (API) function of the SOA system to invoke the service by passing messages according to the protocol for accessing the service. This process of invoking a service is also referred to herein as "invocation" of the service. Data can be included in the invocation message in accordance with a data format specified by metadata associated with the binding.

SOA applications can be implemented using "orchestration" to compose "composite" applications that invoke services. In one example, Business Process Execution Language ("BPEL") is a standardized representation of processes, and the SOA system provides a process engine or manager that enables users to design and execute BPEL processes that invoke the services. The details of the application and services, and the formats of the data that is exchanged, e.g., between different BPEL processes in a composite application, are described by metadata associated with corresponding portions of the services and applications, such as data types associated with bindings.

SUMMARY

In accordance with embodiments of the invention, web services in a Service Oriented Architecture can be invoked using local invocations, which are more efficient than ordinary web service invocations, since the overhead of sending the invocation from an invoker to a server via a network as done in ordinary web service invocations can be eliminated when the invoker and server are located in the same container, e.g., in the same application server on the same computer. The local invocation can also be more efficient because a local invocation can be implemented as a procedure or subroutine call between computer program instructions in the same application server, i.e., from instructions that implement the invoker to instructions that implement the server. Local invocations are not ordinarily performed in existing SOA application servers when Quality of Service features, such as security and user authentication, access control, or message encryption, are enabled for the web service invocations, because invoking the server using a local call, e.g., a function or subroutine call, would bypass the security checks that are performed by the application server as part of ordinary web service invocations, which could lead to a breach of the quality of service terms (e.g., a security breach).

In one or more embodiments, methods and systems are provided for performing local invocations securely when quality of service features are enabled, so the performance benefit of local optimizations can be realized in the presence of quality of service constraints, such as security features. Security features can be enabled for web service invocations by attaching security policies to the invoker (e.g., client) and/or server. Secure local invocations are achieved by augmenting security policies with an attribute that indicates whether each policy can be used with direct invocation, or, for security policies that involve user authentication, whether user authentication is needed prior to making local invocations using those policies. The client and server policies are checked for consistency, e.g., to ensure that if the client policy modifies a message, then there is a corresponding server policy to process the modified message, or vice-versa. If the policies indicate that local invocation is possible for an invocation, and the policies are consistent, then an indication is made to the application server that the web service invocation can be performed using a local invocation.

According to an embodiment of the present invention, a method is provided that includes receiving, at a computer system, a request from a first composite application to invoke a web service operation of a second composite application, where the first application is associated with a reference policy, and the second application is associated with a service policy, determining, by the computer system, based upon the service policy and the reference policy, whether local invocation of the web service operation is secure, and invoking the web service operation using the local invocation in response to determining that local invocation is secure.

Embodiments of the invention may include one or more of the following features. Local invocation may be secure if a first attribute associated with the reference policy and a second attribute associated with the service policy indicate that the reference and service policies can be used in a local invocation. If the first attribute indicates that user authentication is needed for local invocation, and the second attribute indicates that the service policy can be used in a local invocation, then local invocation may be secure if a user requesting the local invocation has been authenticated. Local invocation may be secure if the reference and service policies form a valid configuration for local invocation. The policies may represent a valid configuration if there is a service policy corresponding to each reference policy, wherein the service policy is of the same category as the reference policy, and if there is a service policy of the security category, then there is a corresponding reference policy of the security category. The local invocation may include a procedure call within a process. The local invocation may include a procedure call from instructions that implement the first composite application to instructions that implement the second composite application.

According to an embodiment of the present invention, a system is provided that includes a processor configured to receive a request from a first composite application to invoke a web service operation of a second composite application, where the first application is associated with a reference policy, and the second application is associated with a service policy, determine, based upon the service policy and the reference policy, whether local invocation of the web service operation is secure; and invoke the web service operation using the local invocation in response to determining that local invocation is secure.

According to an embodiment of the present invention, a non-transitory machine-readable medium for a computer system is provided, the non-transitory machine-readable medium having stored thereon a series of instructions executable by a processor, the series of instructions including instructions that cause the processor to receive a request from a first composite application to invoke a web service operation of a second composite application, where the first application is associated with a reference policy, and the second application is associated with a service policy, instructions that cause the processor to determine, based upon the service policy and the reference policy, whether local invocation of the web service operation is secure and instructions that cause the processor to invoke the web service operation using the local invocation in response to determining that local invocation is secure.

The foregoing, together with other features and embodiments will become more apparent when referring to the following specification, claims, and accompanying drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1A:
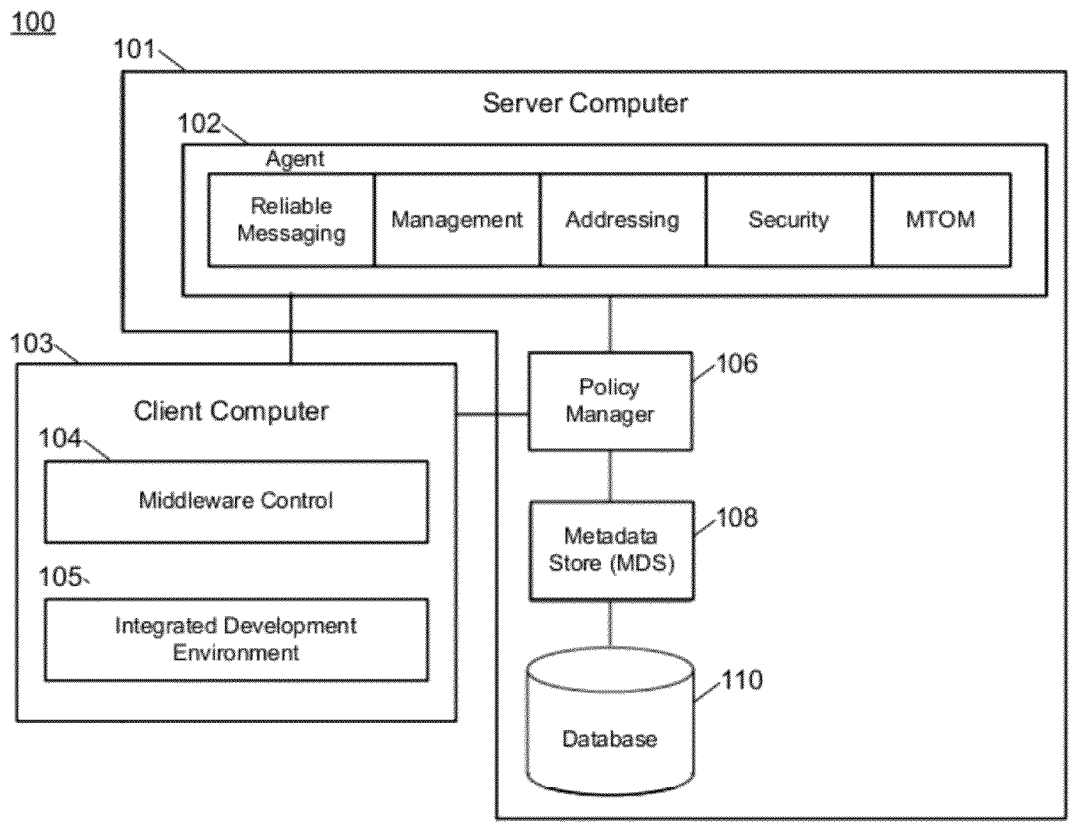
FIG. 1A is a simplified block diagram of process-oriented composite applications in a process execution system 100 according to an embodiment of the present invention.

FIG. 1A is a simplified block diagram of composite applications in a process execution system 100 according to an embodiment of the present invention. The process execution system 100 facilitates execution of defined processes by a server computer system 101. The process execution system 100 may be a software system, a hardware system, an enterprise system, or the like. For example, the system 100 may be a complex enterprise software system such as a Web Services Manager in the Fusion middleware system and related products provided by Oracle® Corporation of California. The Oracle Service Oriented Applications ("SOA") Suite provides a set of components for designing, deploying, and managing composite applications. The SOA Suite enables services to be created, managed, and orchestrated into composite applications and processes. Oracle Service Component Architecture ("SCA") suite uses the SCA assembly model for composing applications. SCA is based upon SOA principles and is documented in specifications maintained by the Organization for the Advancement of Structured Information Standards ("OASIS"). SCA enables business logic to be represented as reusable service components that can be easily integrated into an SCA-compliant application. The resulting application can be referred to as an SOA composite application. In one or more embodiments, the elements illustrated in FIG. 1A, such as an Agent 102, are provided by Oracle Web Services Manager ("WSM"). The process execution system 100 enables developers and system administrators to implement quality of service features for web services, such as security, declaratively, without using program code statements, and to separate quality of service parameters from the web services to which the parameters apply.

As introduced above, as an alternative to coding security logic in the application, the process execution system 100 can be used to implement declarative security and management through predefined policies. A policy-based model can be used to manage and secure Web services across an organization. Policies describe the capabilities and quality of service requirements of a Web service, such as whether and how a message is to be secured, whether and how a message is to be delivered reliably, and so on. Policies can apply security to the delivery of message, and can be managed by developers in a design time environment and system administrators in a runtime environment.

Referring to FIG. 1A, in one or more embodiments, the process execution system 100 can define and enforce security and reliability policies. A client computer 103 can host development and administrative applications, such as Middleware Control 104 and an integrated development environment 105. Middleware Control 104 enables administrators to manage, secure, and monitor Web services. The process execution system 100 includes features that enable users to attach policies to clients and/or service endpoints at design time using the integrated development environment 105, e.g., Oracle JDeveloper, and at runtime using Oracle Enterprise Manager 104. Users can also define authentication and/or authorization policies against an LDAP directory or other identity infrastructures, generate standard security tokens to propagate identities across multiple web services used in a single transaction, and encrypt an element of the payload of a web service request, e.g., a credit card number, to provide data confidentiality. A Policy Manager 106 writes and reads the policies, including predefined and custom policies, to and from a metadata store 108. Web services security and management policies can be defined in the Policy Manager 106, and executed and enforced at runtime through the Agent 102. The Policy Manager 106 can manage and enforce other types of policies in addition to security policies, as further described below.

Figure 1B:
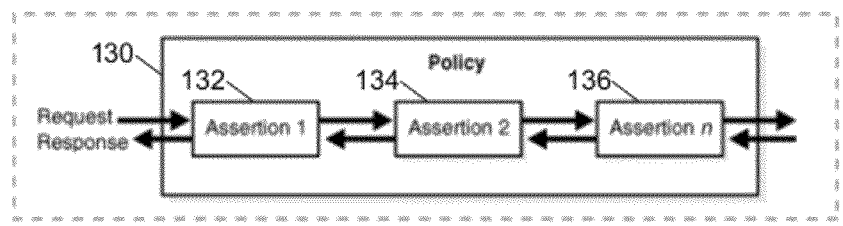
FIG. 1B is a simplified block diagram of a policy with assertions in a process execution system 100 according to an embodiment of the present invention.

FIG. 1B is a simplified block diagram of a policy with assertions in a process execution system 100 according to an embodiment of the present invention. In one example, there are several types of policies 130, including Security policies, Reliability policies, Addressing policies, Management policies, and Message Transmission Optimization Mechanism (MTOM) policies. Security policies support the WS-Security 1.0 and 1.1 standards and enforce authentication and authorization of users, identity propagation, and message protection (message integrity and message confidentiality). Reliability policies support the WS-Reliable Messaging protocol, which provides guarantees about the end-to-end delivery of messages. Addressing policies verify that simple object access protocol (SOAP) messages include WS-Addressing headers in conformance with the WS-Addressing specification. Management policies log request, response, and fault messages to a message log, and can also include custom policies. MTOM policies ensure that attachments are in MTOM format, which enables binary data to be sent to and from web services to reduce the size of messages transmitted via networks. Within each of these categories there are one or more policy types that can be attached. For example, if a user selects the reliability category, two policy types are available for selection: wsrm10_policy and wsrm11_policy, which support versions 1.0 and 1.1 of the Web Services Reliable Messaging protocol, respectively.

In one or more embodiments, the process execution system 100 provides operations to define, enforce, and monitor security and management policies. The "define" operation attaches security and management policies to the web services to be protected. Policies can, for example, authenticate request messages using username/password, decrypt messages using WS-Security, and sign response messages. An "enforce" operation distributes policies from a Policy Manager to several policy enforcement points (PEP) or Agents 102 that execute security and management policies at runtime. The Agent 102 manages the enforcement of policies using a Policy Interceptor Pipeline, in which Policy Interceptors enforce policies 130. The Metadata Store 108 stores the policies 130. The policies 130 can be stored as files in the file system or to a database 110, which provides database support for the Metadata Store 108.

A policy 130 can include one or more policy assertions 132, 134, 136. A policy assertion 132 is a unit of a policy that performs a specific action for the request and response operations. Assertions 132, like policies 130, belong to one of the following categories: Reliable Messaging, Management, WS-Addressing, Security, and Management. Policy assertions 132 are executed for the request message and the response message, and the same set of assertions is executed on both types of messages. The assertions 132, 134, 136 are executed by the policy interceptors in the order in which the assertions appear in the policy 130.

In one example, a security policy 130 extracts a security token from a request message being sent to a service associated with the policy 130. The security token can be, for example, a username/password (extracted from the HTTP header, WS-Security header, or from the message body); an X.509 certificate used for signing the request; a Kerberos ticket; or other type of token. The extracted token can be sent to a login module, which validates the token, and then passes the credential information stored within the token to an application server authenticator. The application server authenticator can be configured to validate credentials against a variety of identity stores such as LDAP and the like. If successful, the authenticator creates a Java® programming language Subject and populates it with principals containing the username and roles associated with the authenticated user. The Subject is then made available to subsequent policy assertions and the web service itself.

Figure 2:
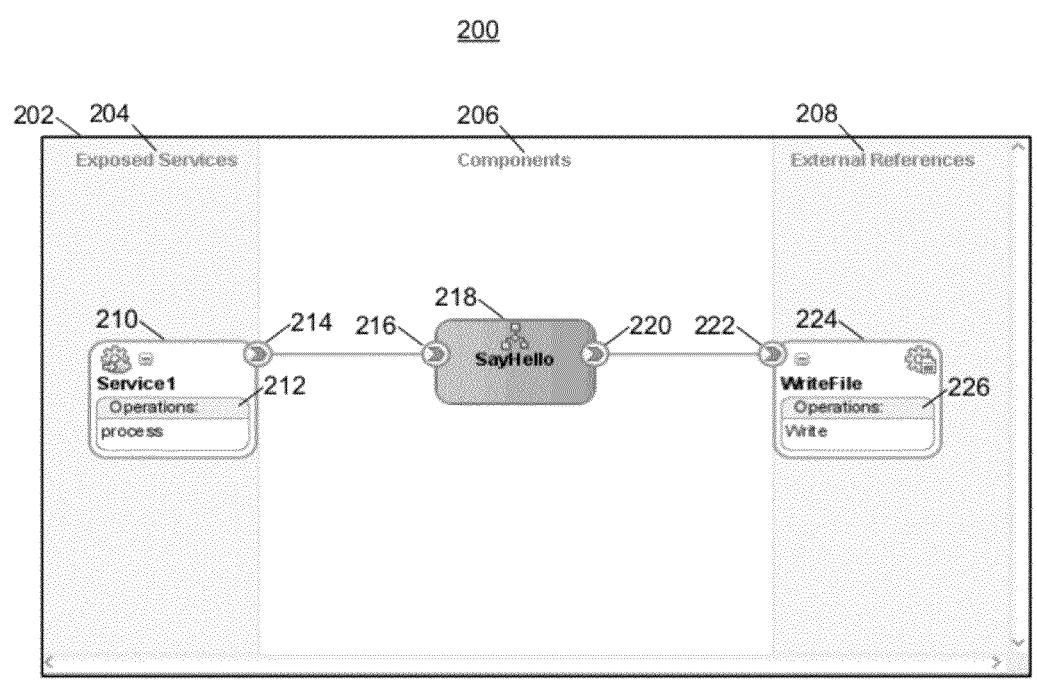
FIG. 2 illustrates service and reference components in a composite application in accordance with one embodiment.

FIG. 2 illustrates service and reference components in a composite application in accordance with one embodiment. In an integrated development environment user interface 200, such as that provided by Oracle JDeveloper, a user can create a new SOA composite application 202 and add a service component 218 to the application 202. The application 202 is represented by three panels 204, 206, 208 onto which a developer can place items, e.g., by dragging and dropping items from elsewhere in the user interface 200. Items that represent exposed services are placed on the left panel 204, items that represent components are placed on the middle panel 206, and items that represent external references are placed on the right panel 208. The exposed services on the left panel 204, such as a service 210, can receive requests to invoke service operations 212, and a reference 224 can send requests to invoke operations 226 to other services (not shown).

The Service1 service 210 and the WriteFile reference 224 are examples of "policy subjects." A policy subject is, in one aspect, an entity or resource to which policies can be attached. Attaching a policy to a policy subject imposes quality of service constraints on communications to or from the policy subject, and/or causes other operations to be performed, such as encryption and decryption of the communications. Policy subjects can include Web services endpoints, Web service clients, SOA service endpoints, SOA clients, SOA components, and the like. There are different policies for different types of resources (for example, a Web service or a SOA component). Enforcement of the policy can begin once the policy is attached to a policy subject. Attached policies are enforced by the Agent 102, which intercepts requests to and responses from an application, and enforces the policies that are associated with requests and responses. The Agent 102 retrieves the policy definitions from the Policy Manager 106. For example, if a request message sent to a component 218 does not satisfy a security policy attached to the component's service binding 216, the Agent 102 will not forward the request message to the component 218. The Agent can similarly enforce policies attached to the reference binding 214 of the Service1 service component 210, policies attached to a reference binding 220 of the component 218, and policies attached to a service binding 222 of the WriteFile reference component 224.

As introduced above, applications can invoke services by exchanging messages, e.g., by sending a request message from the application to a server that implements a service, and receiving a response message sent by the server back to the application after execution of the service. Messages can be sent and received via a channel, e.g., a network connection. Services 210 use "endpoints" to access the channels and send/receive messages. An endpoint associates a binding with a network address that may be used to communicate with a service 210. A binding establishes a connection between an SOA composite application 202 and the external world. There are two types of binding components: services 210, which provide the outside world with an entry point to the SOA composite application 202 and describe the protocols that can communicate with the service 210 (for example, SOAP/HTTP), and references 224, which enable messages to be sent from the SOA composite application 202 to external services in the outside world.

Developers or users can define or create the service components 210, 218, 224 that implement application business logic or processing rules. As introduced above, a service named Service1 210 is shown in the left panel. Service1 210 provides the entry point to the composite application 202. Service1 210 is "wired" to the service component 218, as shown by the line from a Service1 reference handle 214 to a SayHello BPEL process interface 216 of the service component 218. The service component 218 is shown in the middle panel 206. Wiring enables web service message communication with application components such as the SayHello BPEL process 218. In one or more embodiments, a first service component 210 can be wired to another service component 218 if the first service component's reference 214 matches the service 216 of the target service component 218, i.e., has the same interface as the target service component 218.

The SOA composite application 202 also includes a reference component 224 that enables the application 202 to send messages to external services, e.g., services in the outside world. The reference 224 is shown in the right panel 208. A reference 224 component can be, for example, a web service, an adapter, an EJB service, or other process. In this example, the reference 224 is a File Adapter, which includes an operation 226 that is configured to write data received from the SayHello BPEL process 218 to a file. The SayHello BPEL process reference 220 is wired to the WriteFile service binding component 222.

The development user interface 200 provides features that a user can use to attach a policy to a service or reference binding component. To attach a policy, a user can select a service or reference binding component, then select a menu option to configure WS-Policies for the selected binding component. The user can then select the type of binding to use for the request. This selection enables communication between the binding component and the service component. When a request binding is configured for a service 210 in the Services panel 204, the service 210 acts as a server. When request binding is configured for a reference 224 in the References panel 208, the reference 224 acts as a client. The user interface 200 then displays the following categories of polices for attachment: MTOM, Reliability, Addressing, Security, and Management. In this example, the Security category is selected for attachment. The user can then select the type of policy to attach, e.g., "binding_permission_authorization_policy" to add a binding permission authorization policy.

Developers and/or administrators can attach or detach policies to or from service binding components, service components, and reference binding components in a SOA composite application. A developer can attach policies for testing security in a design-time environment, as described above. When an application is ready for deployment to a production environment, an administrator can attach or detach runtime policies. At design time, policy references (e.g., policy names) are attached to the web service. When the web service is deployed to an application server, the Agent 102 retrieves the policy definition details from the Policy Manager 106 by providing the policy name as the key for lookup. Administrators can attach (and detach) policies in clients and services or make changes to policies already attached.

Figure 3:
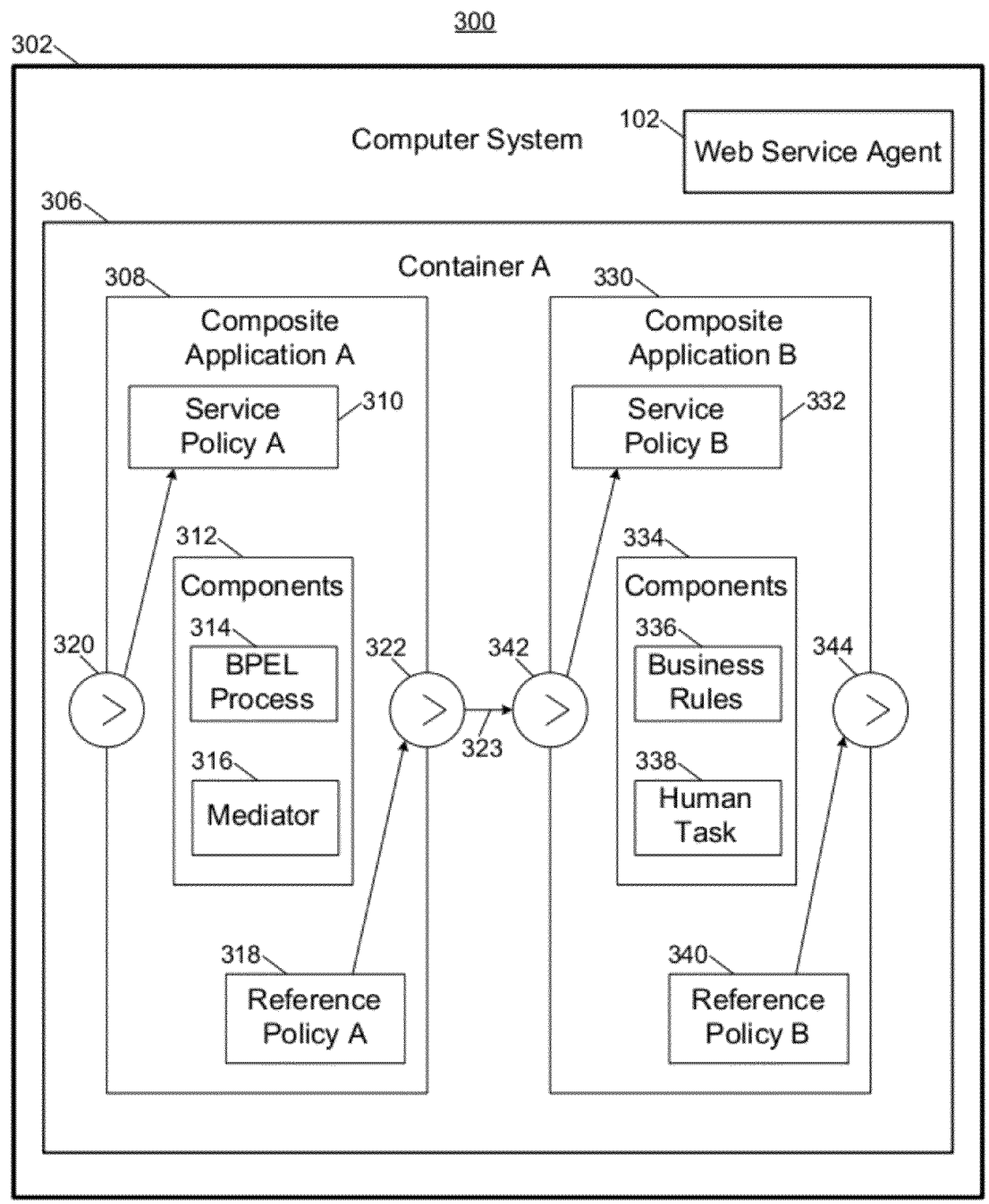
FIG. 3 is a simplified block diagram of a composite-to-composite invocation in a system 300 according to an embodiment of the present invention.

FIG. 3 is a simplified block diagram of a composite-to-composite invocation in a system 300 according to an embodiment of the present invention. As depicted in FIG. 3, a computer system 302 comprises a web service agent 102, which corresponds to the Agent 102 of FIG. 1A, and an application container 306, e.g., an application server or the like. The application container 306 includes a first composite application A 308 and a second composite application B 330. A reference binding 322 of composite application A 308 is wired to a service binding 342 of the composite application B 330, thereby establishing a configuration in which a component-to-component invocation can be made.

The two composite applications A 308 and B 330 are co-located in the same container 306, so "local invocations" 323 (indicated by an arrow) between the two applications are possible. Local invocations can be understood as invocations of web service operations, e.g., via service or reference bindings, that are executed between two components in the same container, e.g., in the same application server, and do not involve network communication and the overhead of converting the invocation to a representation suitable for network communication. In a local invocation, networking protocol and message formatting operations that would otherwise be performed to construct and send the messages are bypassed, resulting in a substantial performance improvement. The network protocol that is bypassed may be, for example, an HTTP stack, and the message conversions may be, for example, SOAP/NM conversions. As described above, the local invocation can be performed if there are no policies attached to application A 308 and application B 330, because there are no security policy checks or other operations to be performed or enforced for the invocation. Local invocations can be implemented by a mechanism such as a procedure or subroutine call between code instructions. In one or more embodiments, when a composite application A 308 invokes a second composite application B 330 in a composite-to-composite invocation, if the first and second composite applications are co-located in the same container or server, the invocation can be performed using a local invocation, bypassing the sending and receiving of request and response messages that would otherwise be sent to and received from the second composite application B 330 to perform the invocation. A local invocation, or the identification of a situation in which a local invocation is possible, is referred to as a "local optimization" to indicate the expected performance benefit.

Referring to FIG. 3, the application A 308 includes components 312, such as a BPEL process 314 and a Mediator process 316. The components 312 are wired to service bindings 320 and reference bindings 322 in the application A 308. Similarly, application B 330 includes components 334, such as Business Rules 336 and a Human Task 338. The components 334 are wired to service bindings 342 and reference bindings 344. Further, the reference binding 322 of application A 308 are wired to the service binding 342 of application B 330, thereby establishing one of the conditions for a component-to-component invocation.

In application A 308, a service policy A 310 is attached to, i.e., associated with, the service binding 320, and a reference policy A 318 is attached to the reference binding 322. Either or both of the service and reference policies can include one or more security policies, but for the purposes of describing local invocations, the reference policy A 318 is shown as a security policy attached to the reference binding 322. In application B 330, a service policy B 332 is attached to the service binding 342, and a reference policy B 340 is attached to the reference binding 344. For the purposes of describing local invocations, the service policy B 332 can be a security policy attached to the service binding 342. The effects of the reference policy A 318 and the service policy B 332 on local invocation optimizations is described in further detail below.

A number of pre-defined policies are provided with the system 100, and developers and users can define new policies. These policies are implemented by Policy objects in a programming language such as Java, C++, or the like. Each Policy object can have an attribute named "local-optimization" to which the Policy can assign a value that indicates whether local optimization is permitted for that Policy, as needed by the rules associated with that Policy. If the value is "off" or the attribute is not present or has not been set, then local optimization is not performed for invocations involving that policy, so that such invocations instead use the WS/SOAP/HTTP stack and interceptors. That is, local optimization is optional and is disabled by default for policies that do not explicitly enable it. Policies can set their local-optimization attributes to "check_identity" to indicate that a local optimization is only to be performed if the user has been authenticated, e.g., if an authenticated, valid Java Authentication and Authorization Service (JAAS) Subject exists in the current thread or process. Otherwise, if there is no valid JAAS Subject in the current thread or process when a Policy has declared "check_identity", local optimization is not performed for that Policy. Alternatively, policies can set their local-optimization attribute to "on" to indicate that local optimization is to be performed when possible. The local-optimization Policy attribute is used by, for example, the process depicted in FIG. 6.

Existing techniques use a local function call when no policy references are specified for both the source reference binding and target service binding. Existing techniques have not used the local invocation when a policy reference is attached to one of the bindings. Using a local function call for an invocation without checking and enforcing a security policy attached to the binding could lead to a security breach. Thus, to perform the local function call, security checks are first performed, and the call is only executed if the security checks indicate that sufficient security credentials are present to meet the attached security policy.

Figure 4:
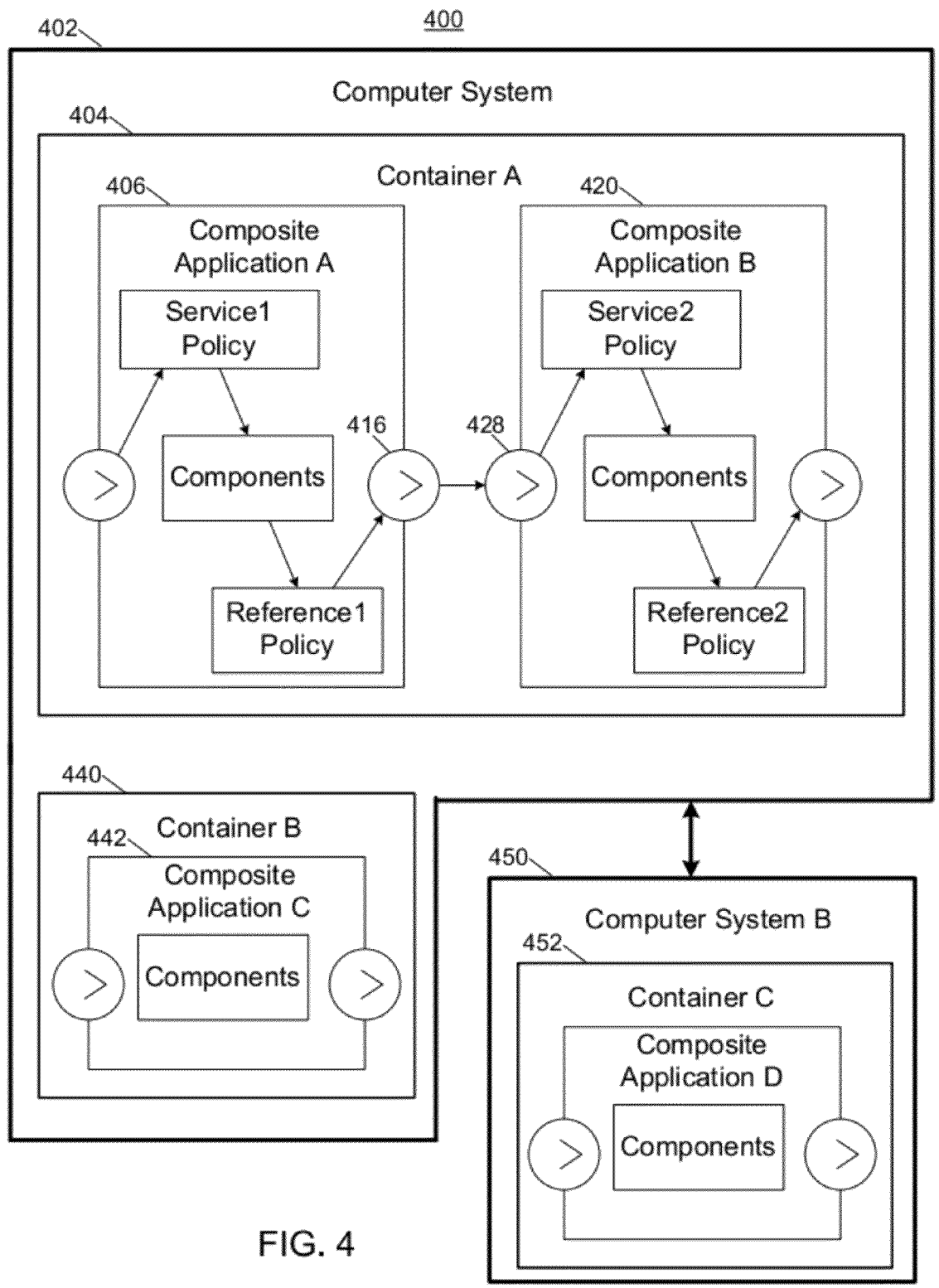
FIG. 4 is a simplified block diagram of a composite-to-composite invocation in a system 400 having multiple networked computer systems according to an embodiment of the present invention.

FIG. 4 is a simplified block diagram of a composite-to-composite invocation in a system 400 having multiple networked computer systems according to an embodiment of the present invention. As depicted in FIG. 4, a computer system 402 comprises a first application container 404, e.g., an application server or the like. The first application container 404 includes a composite application A 406 and a composite application B 420. A reference binding 416 of composite application A 406 is wired to a service binding 428 of the composite application B 420, thereby establishing a configuration in which a component-to-component invocation can be made. The two composite applications A 406 and B 420 are co-located in the same container 404, so local invocations between the two applications are possible. A second container 440 is also located on the computer system 402, and includes a composite application C 442. In one or more embodiments, local invocations are not made from container A 404 to container B 440, since the application C 442 is not co-located in the same container as application A 406 or application B 420. A second computer system B 450 includes a third container C 452. Although invocations can be made between applications hosted by containers A, B, and C, such invocations are performed using messages sent between containers or via a network. Local invocations are possible between applications hosted by container C, but, in one or more embodiments, local invocations are not made between applications running on different computer systems 402 and 450, because the containers that host the applications running on the different computer systems are not co-located.

Figure 5:
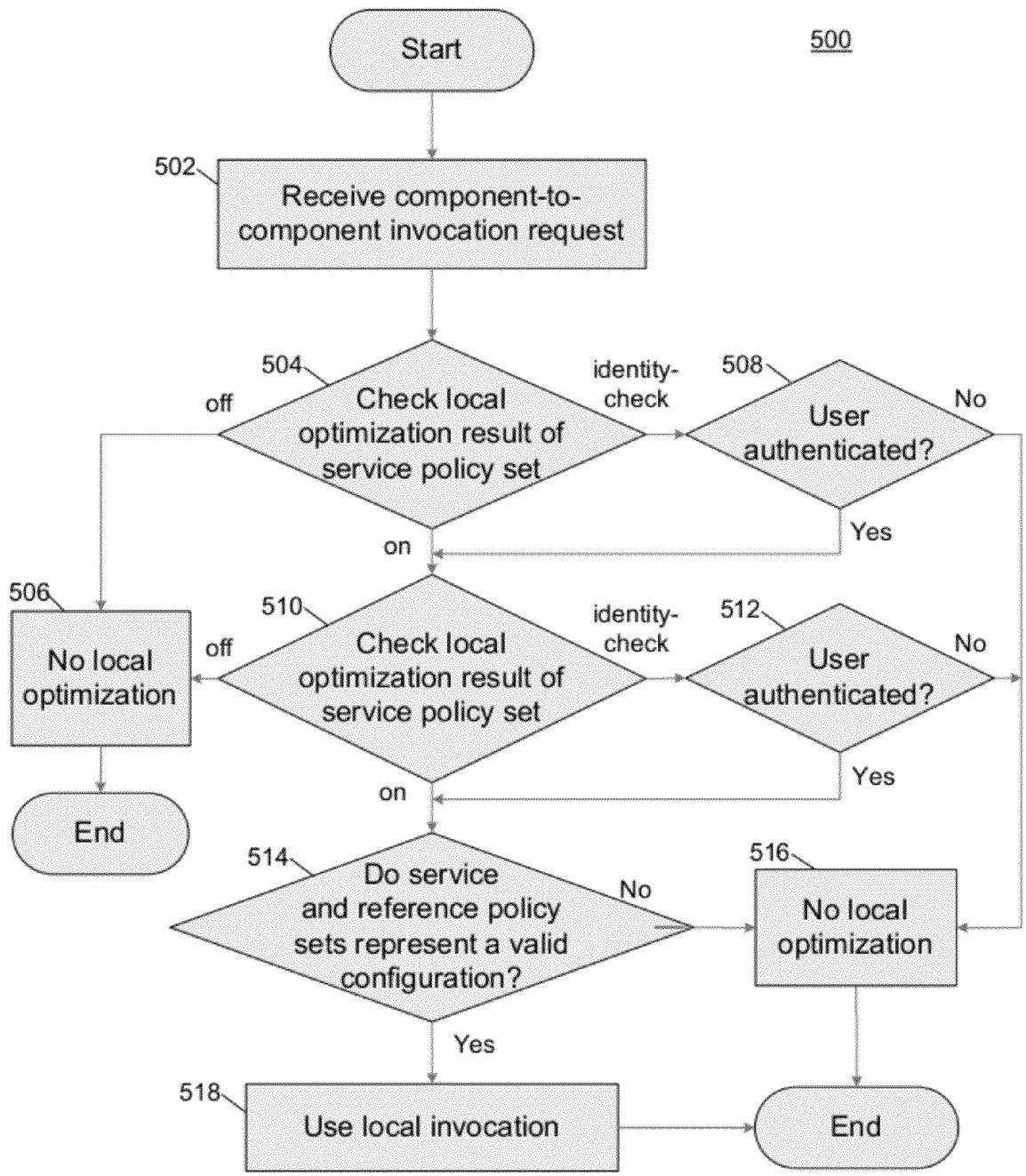
FIG. 5 is a simplified flow diagram illustrating a method for determining whether to use a local call for an invocation associated with given service and reference policies according to an embodiment of the present invention.

FIG. 5 is a simplified flow diagram illustrating a method 500 for determining whether to use a local call for an invocation associated with given service and reference policies according to an embodiment of the present invention. The processing depicted in FIG. 5 may be performed by software (executed by a processor), hardware, or combinations thereof. In one example, composite applications are executed by a "Fabric" component of the SOA system (not shown). When the Fabric determines that a component-to-component service invocation is to be executed, and both components are co-located such that a local invocation is possible, the Fabric system invokes the process of FIG. 5 to determine whether the invocation can be securely performed by a local call, and if so, the Fabric uses a local call instead of creating and sending a message via a network. As introduced above, a local function or subroutine call is possible in a composite-to-composite invocation made in a first composite application 308, in which the reference 322 of the first composite application 308 specifies a web service binding 342 of a second composite application 330, and the component to be invoked is in the same container as the invoking component, such that a local call is possible.

In one or more embodiments, a local call can be used in the presence of policy references by checking the individual policies (e.g., WS Policies) referred to by the reference and service policy references associated with the bindings or components involved in the invocation. The decision as to whether a security policy is satisfied and can be bypassed is determined based upon information provided by the particular security policy itself. As introduced above, in one example, each type of policy has an attribute that indicates, i.e., declares, how local invocations are to be handled in the presence of that policy. This local invocation policy attribute can have the value "on" to indicate that local invocation is permitted for invocations involving the policy, "off" to indicate that local invocation is prohibited for invocations involving the policy, and "check_identity" to indicate that local invocation is permitted for invocations involving the policy if the user's identity has been successfully authenticated prior to each of the invocations.

In the method of FIG. 5, block 502 receives a container-to-container invocation request. Block 504 determines the local optimization result of the service policy set by invoking the process of FIG. 6 with the service policy set as a parameter. The process of FIG. 6 evaluates the local optimization attribute of each policy in the policy set, and returns a result for the policy set, as described below. Block 504 determines if local invocation is possible for the service policy set based upon the result of the process of FIG. 6. The process of FIG. 6 may return the value "off" to indicate that local invocations are "off", in which case block 506 produces a result indicating that local optimization is not possible for this invocation. The process of FIG. 6 may alternatively return the value "identity-check", in which case block 508 determines if there is a valid JAAS Subject representing an authenticated user in the current thread. A JAAS Subject has security-related attributes, i.e., credentials. The credentials in the Subject can indicate that the current user, who is the user requesting the invocation that is being considered for local invocation, has been authenticated successfully, e.g., has provided a valid password or private key certificate in the recent past. The credentials can be, for example, private cryptographic keys, public key certificates, or Kerberos server tickets. If block 508 determines that there is no valid Subject, block 516 produces a result indicating that local optimization is not possible for this invocation. Otherwise, if there is an authenticated JAAS Subject in the current process or thread, e.g., a password or certificate, then control transfers to block 510, which determines the local optimization result for the reference policy set by invoking the process of FIG. 6 a second time, this time using the reference policy set as a parameter. If the second invocation of the process of FIG. 6 returns the value "off", then block 506 produces a result indicating that local optimization is not possible for this invocation. If the second invocation of the process of FIG. 6 returns "identity-check", then block 512 determines if there is a valid JAAS Subject in the current thread or process. If there is no valid JAAS Subject present, block 516 produces a result indicating that local invocation is not possible. If there is a valid Subject present, then control transfers to block 514, which invokes the process of FIG. 7 to determine if the service and reference policies represent a valid configuration for a local invocation. If the process of FIG. 7 indicates that there is not a valid configuration, then block 516 produces a result indicating that a local invocation is not possible. Otherwise, if there is a valid configuration, then block 518 produces a result indicating that local invocation is possible for this invocation and can be performed (e.g., by the Fabric) without violating the service and reference policies.

Figure 6:
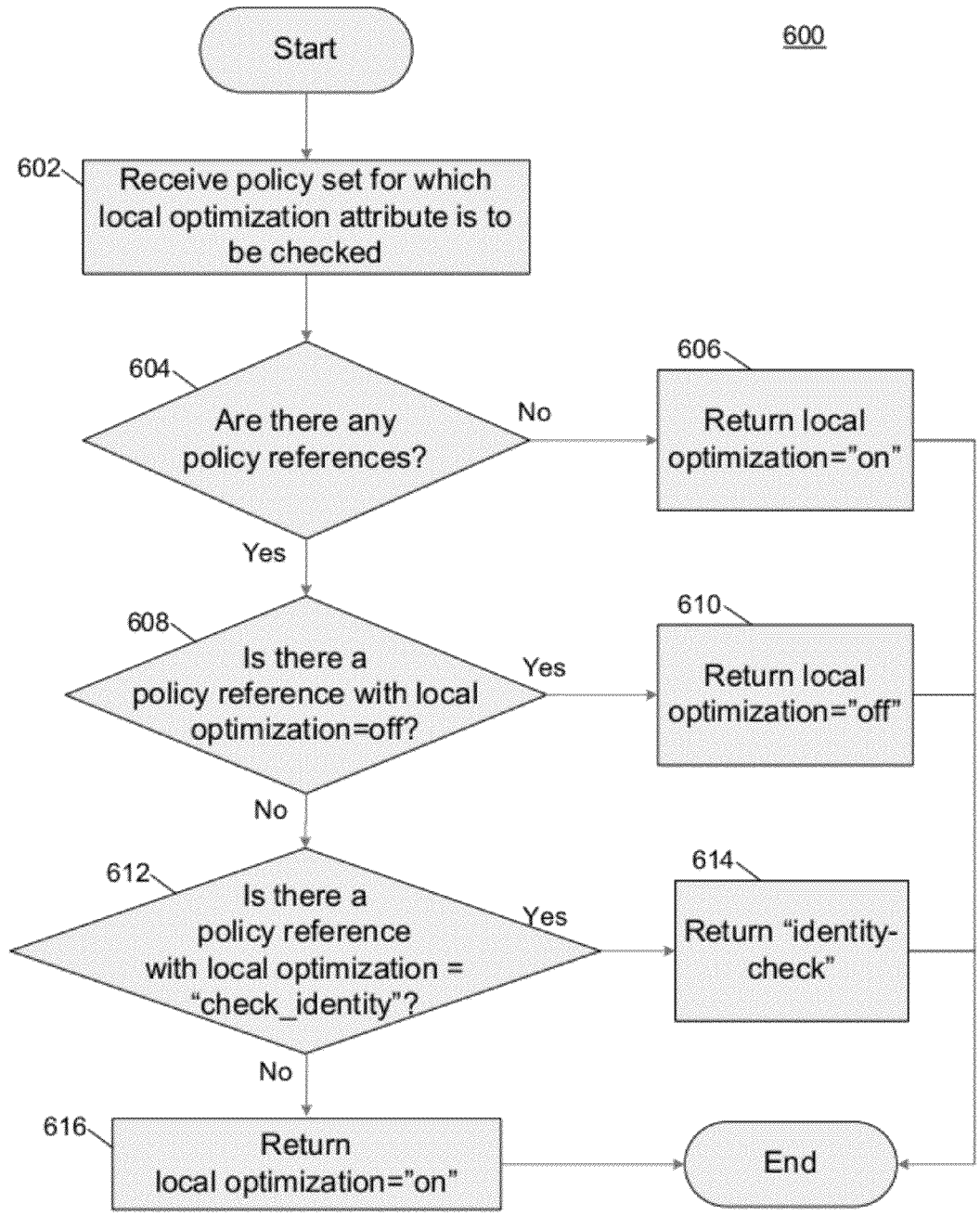
FIG. 6 is a simplified flow diagram illustrating a method for checking if a local optimization is valid for a given policy according to an embodiment.

FIG. 6 is a simplified flow diagram illustrating a method 600 for checking if a local optimization is valid for a given policy set according to an embodiment. The processing depicted in FIG. 6 may be performed by software (executed by a processor), hardware, or combinations thereof In one embodiment, the process of FIG. 6 is invoked once for the service (i.e., incoming) policy reference and once for the reference (i.e., outgoing) policy reference. These invocations are made by blocks 504 and 510, respectively, of FIG. 5. Block 602 receives a policy set (which can contain either service or reference policy references) associated with the invocation. Block 604 checks if there are any policy references is in the set. If block 604 determines that there are no policy references in the received policy set, then there are no policies to check and no violations are possible, so block 606 returns the value "on" to indicate to the caller (e.g., the process of FIG. 5) that a local invocation is at least possible, and can be made if the policy configurations are valid for a local optimization. Otherwise, if at least one valid policy reference is received at block 602, then the received policy reference or references (e.g., entries in a Policy Set object) are examined at blocks 608 and 612 to determine if a local call is possible. Block 608 determines whether at least one of the policy references has a local optimization attribute set to the value "off". If so, block 610 returns the value "off" to indicate to the caller that the invocation should not use a local call, but should instead be made through the WS/SOAP/HTTP request message route. Otherwise, block 612 determines whether at least one of the policy references has the attribute value local-optimization set to "check identity". If so, block 614 returns the value "identity-check" to indicate that verification of user identity is needed, and the invocation can use a local call if valid user authentication credentials are present. Otherwise, the policy references have the value "on", and block 616 returns the value "on" to indicate that a local invocation can be made if the policy represents a valid configuration, which is determined by the method of FIG. 7.

Figure 7:
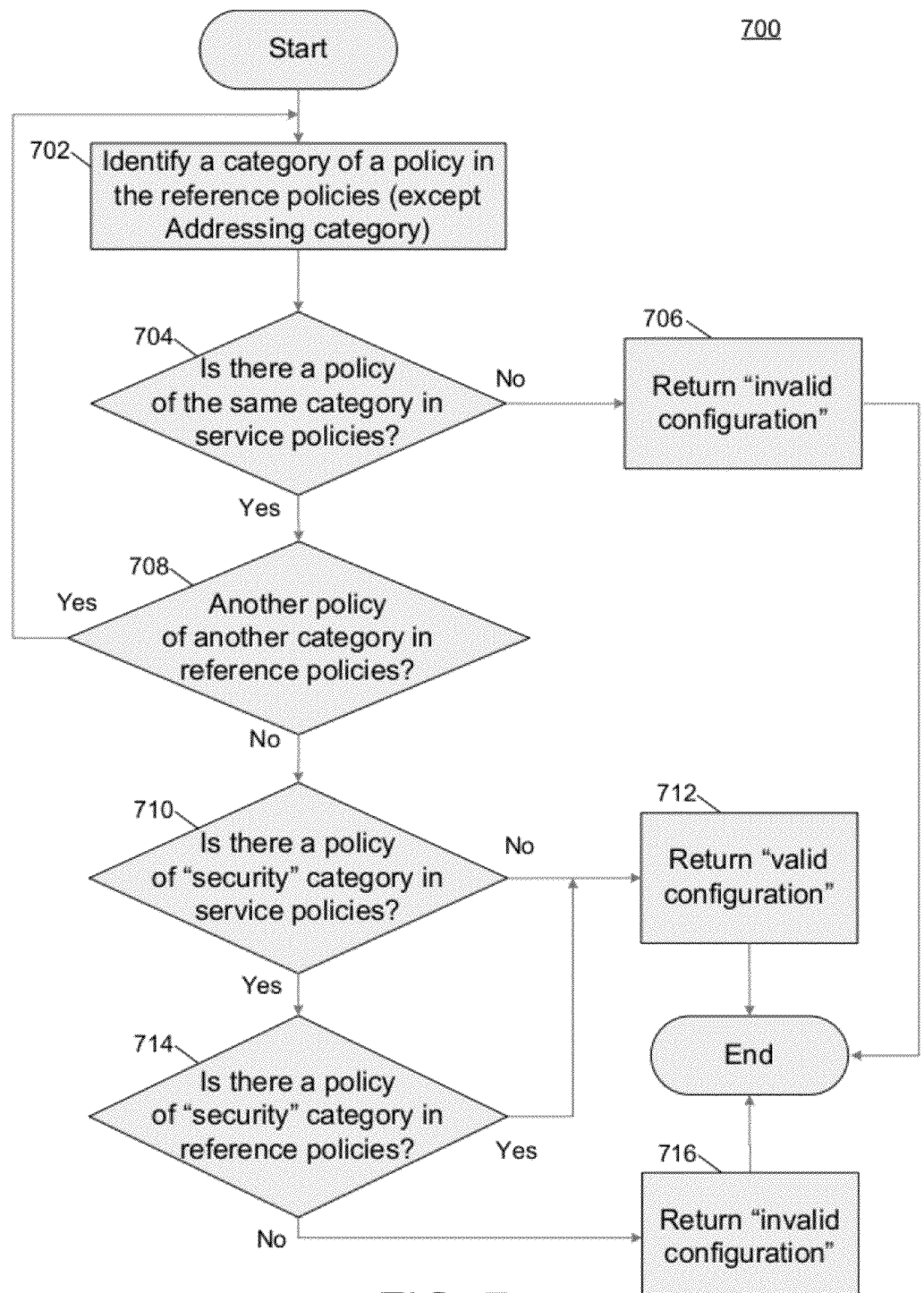
FIG. 7 is a simplified flow diagram illustrating a method for checking if given service and reference policies represent a valid configuration according to an embodiment.

FIG. 7 is a simplified flow diagram illustrating a method 700 for checking if given service and reference policies represent a valid configuration according to an embodiment. The processing depicted in FIG. 7 may be performed by software (executed by a processor), hardware, or combinations thereof In one embodiment, the processing depicted in FIG. 7 is invoked by block 514 of FIG. 5. The method 700 determines if there are matching policies in the service policies of the same category as policies in the references policy set contained in the reference policy, and vice-versa. Blocks 702-708 determine if the reference policy or policies represent a valid configuration by checking if there is a matching service policy for each type of policy in the reference policies.

Block 702 identifies a category of a policy in the given reference policy or policies. The category is, for example, Security, Reliable Messaging (RM), MTOM, or Addressing. In one example, Addressing policies need not be checked, because absence of an Addressing policy on the service side is acceptable even if there is an Addressing policy on the reference side. Therefore, block 702 does not pass any Addressing policies to block 704. For the other types of policies, for each category of policy on the reference (e.g., client) side, there should be a policy with the same category on the service (e.g., server) side. Block 704 thus checks whether there is a service policy of the same category that was identified in block 702. For example, if the category of reference policy identified in block 702 is Security, block 704 determines whether there is a Security policy in the service policy or policies associated with the invocation. If not, block 706 returns a value to the invoking process (e.g., block 514 of FIG. 5) indicating that the configuration is not valid, because there is a category of reference policy without a matching service policy of the same category. Otherwise, if block 704 finds a Security service policy, then block 708 determines if there is another category of policies in the reference policies, i.e., a different category that has not yet been processed by block 702. If block 708 finds such a category (e.g., Reliable Messaging), then control transfers back to block 702 to check if there is a matching service policy of that category. Otherwise, if all reference policies associated with the invocation have been processed, block 708 transfers control to block 710.

Blocks 710-714 determine if the service policy or policies represent a valid configuration. In one example, for RM/MTOM/Addressing categories, the reference policy can be generated from the service policy, so these categories of policies need not be present in the reference policy set. Further, the Addressing policy can be present on the reference side but not on the server side, because the server side Addressing policy ordinarily enforces that addressing headers need to be present, and these headers ordinarily are present. Thus the security policy category is checked in blocks 710-714. Block 710 determines whether there is a security policy in the service policy set. If not, then there is no need to check for a matching security policy in the reference policy set, and block 712 returns a value indicating that the configuration is valid. Otherwise, if there is a security policy in the service policy set, block 714 determines if there is a corresponding security policy in the reference policy set. If there is not, block 716 returns a value indicating that the configuration is not valid. Otherwise, there is a security policy in the reference policy or policies, and block 712 returns a value indicating that the configuration is valid. Other conditions can be checked in other embodiments, e.g., if there are one-way asynchronous invocations, then callback invocations are possible. For callback invocations, FIG. 5 invokes the method of FIG. 6 for the callback policy set instead of for the reference policy set, and the method of FIG. 7 is extended to check that each category of policy that exists on the server side (RM and MTOM in addition to Security) also exist on the client side, except for Addressing policies, which need not be checked.

Figure 8:
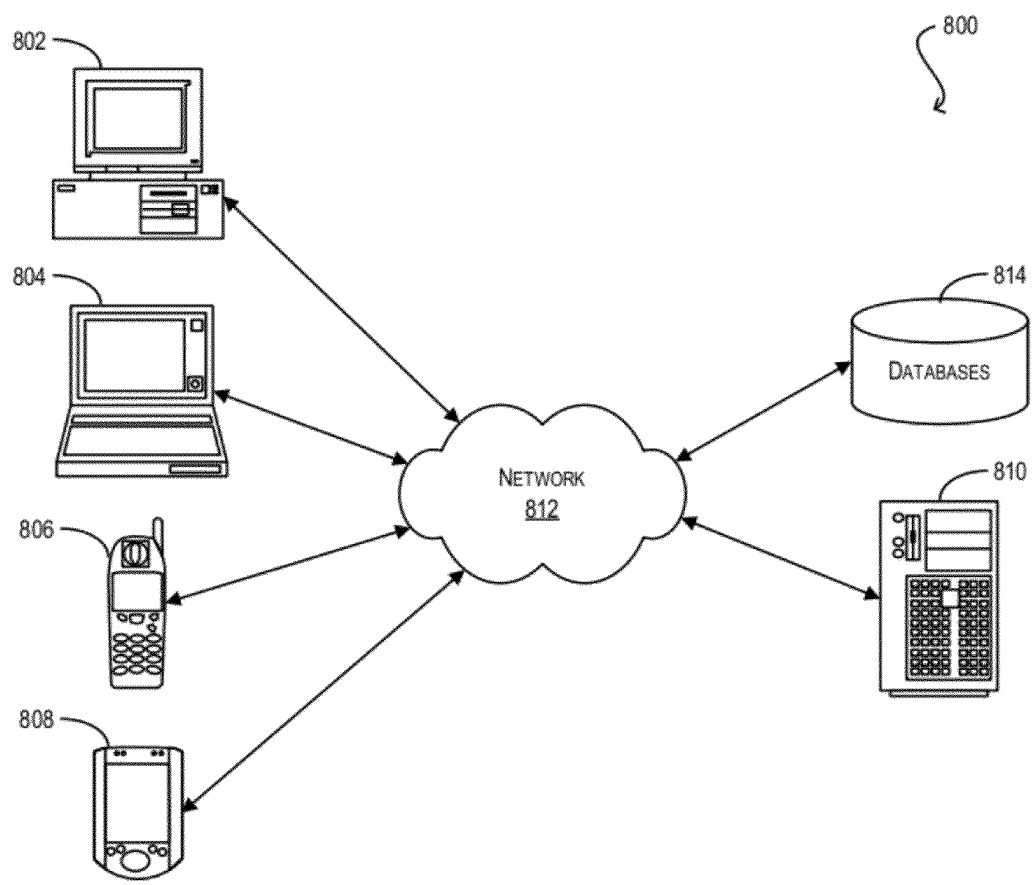
FIG. 8 is a simplified block diagram illustrating a system environment that can be used in accordance with an embodiment of the present invention.

FIG. 8 is a simplified block diagram illustrating a system environment 800 that can be used in accordance with an embodiment of the present invention. As shown, system environment 800 can include one or more client computing devices 802, 804, 806, 808, which can be configured to operate a client application such as a web browser, a UNIX/Solaris terminal application, and/or the like. In various embodiments, client computing devices 802, 804, 806, 808 can correspond to client 103 of FIG. 1A, and can be operated by one or more users to invoke and interact with Fusion Middleware Control 104 and/or the integrated development environment 105.

Client computing devices 802, 804, 806, 808 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, 808 can be any other electronic device capable of communicating over a network, such as network 812 described below. Although system environment 800 is shown with four client computing devices, it should be appreciated that any number of client computing devices can be supported.

System environment 800 can further include a network 812. Network 812 can be any type of network familiar to those skilled in the art that can support data communications using a network protocol, such as TCP/IP, SNA, IPX, AppleTalk, and the like. Merely by way of example, network 812 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 can further include one or more server computers 810 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 810 can run an operating system including any of those discussed above, as well as any commercially available server operating system. Server 810 can also run any of a variety of server applications and/or mid-tier applications, including web servers, FTP servers, CGI servers, Java virtual machines, and the like. In one set of embodiments, server 810 can correspond to server 101 of FIG. 1A.

System environment 800 can further include one or more databases 814. In one set of embodiments, databases 814 can include databases that are managed by server 810. Databases 814 can reside in a variety of locations. By way of example, databases 814 can reside on a storage medium local to (and/or resident in) one or more of computers 802, 804, 806, 808, and 810. Alternatively, databases 814 can be remote from any or all of computers 802, 804, 806, 808, and 810, and/or in communication (e.g., via network 812) with one or more of these. In one set of embodiments, databases 814 can reside in a storage-area network (SAN) familiar to those skilled in the art.

Figure 9:
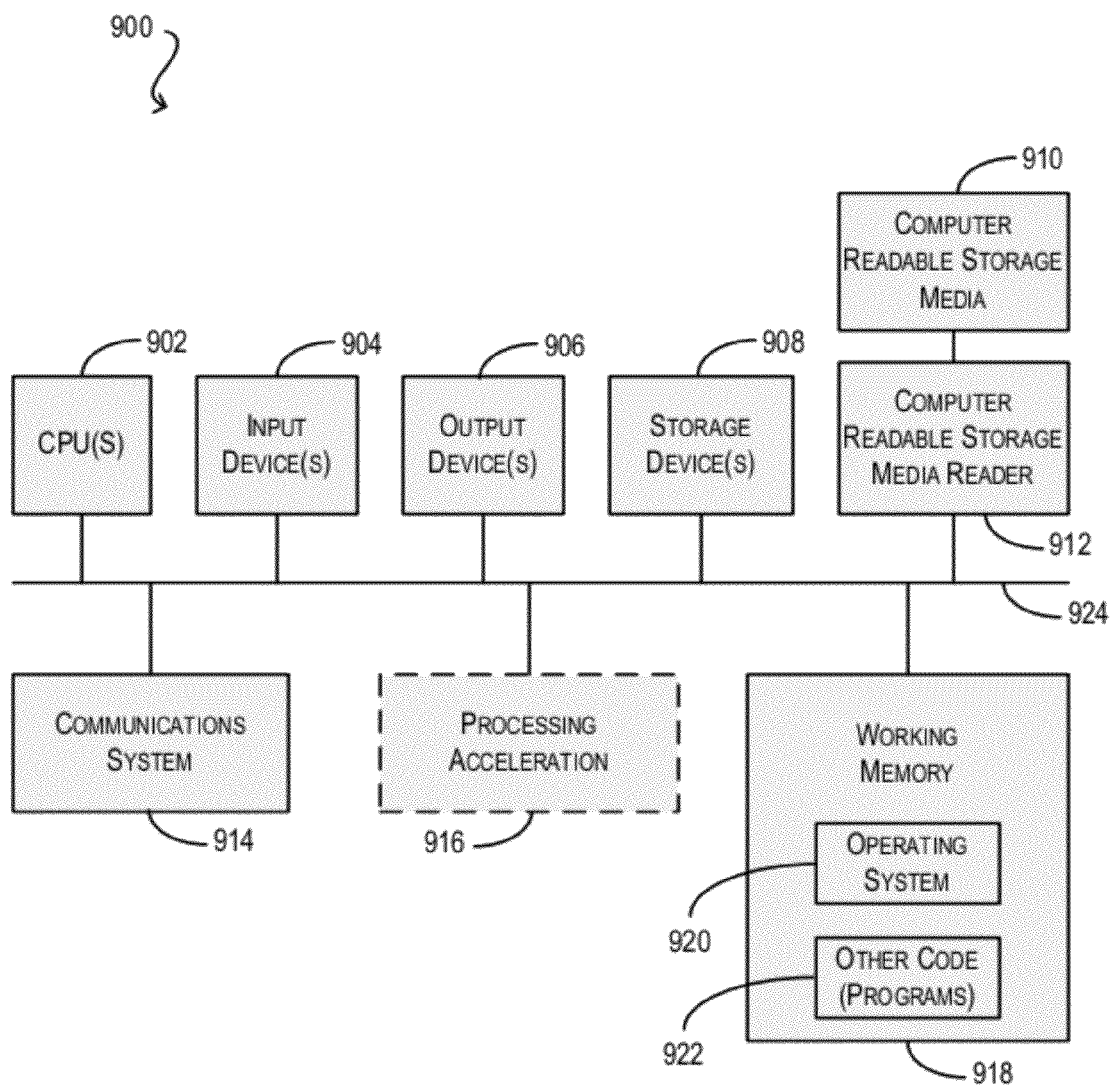
FIG. 9 is a simplified block diagram illustrating a computer system that can be used in accordance with an embodiment of the present invention.

FIG. 9 is a simplified block diagram illustrating a computer system 900 that can be used in accordance with an embodiment of the present invention. In various embodiments, computer system 900 can be used to implement any of computers 802, 804, 806, 808, and 810 described with respect to system environment 800 above. As shown, computer system 900 can include hardware elements that are electrically coupled via a bus 924. The hardware elements can include one or more central processing units (CPUs) 902, one or more input devices 904 (e.g., a mouse, a keyboard, etc.), and one or more output devices 906 (e.g., a display device, a printer, etc.). Computer system 900 can also include one or more storage devices 908. By way of example, the storage device(s) 908 can include devices such as disk drives, optical storage devices, and solid-state storage devices such as a random access memory (RAM) and/or a read-only memory (ROM), which can be programmable, flash-updateable and/or the like.

Computer system 900 can additionally include a computer-readable storage media reader 912, a communications subsystem 914 (e.g., a modem, a network card (wireless or wired), an infra-red communication device, etc.), and working memory 918, which can include RAM and ROM devices as described above. In some embodiments, computer system 900 can also include a processing acceleration unit 916, which can include a digital signal processor (DSP), a special-purpose processor, and/or the like.

Computer-readable storage media reader 912 can be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 can permit data to be exchanged with network 812 and/or any other computer described above with respect to system environment 800.

Computer system 900 can also comprise software elements, shown as being currently located within working memory 918, including an operating system 920 and/or other code 922, such as an application program (which may be a client application, Web browser, middle tier/server application, etc.). It should be appreciated that alternative embodiments of computer system 900 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 900 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
receiving, at a computer system, a request from a first composite application to invoke a web service operation of a second composite application,
wherein the first composite application is associated with a reference policy, and the second composite application is associated with a service policy;
determining, by the computer system, based upon the service policy and the reference policy, whether a first mechanism that provides local invocation of the web service operation is secure, the first mechanism providing an optimized invocation of the web service compared to a second mechanism that provides invocation of the web service; and
invoking the web service operation using the first mechanism that provides local invocation rather than the second mechanism in response to determining that the first mechanism that provides local invocation is secure;
wherein determining whether the first mechanism that provides local invocation of the web service is secure comprises determining that an attribute associated with the reference policy and an attribute associated with the service policy indicate that the reference and service policies are applicable to local invocation determinations.

2. The method of claim 1, wherein determining whether the first mechanism that provides local invocation of the web service is secure comprises determining that an attribute associated with the reference policy indicates that user authentication is needed for a local invocation determination, that an attribute associated with the service policy indicates that the service policy can be used in a local invocation determination, and that a user requesting the local invocation has been authenticated.

3. The method of claim 1, wherein determining whether the first mechanism that provides local invocation of the web service is secure comprises determining that local invocation is secure when the reference and service policies form a valid configuration for local invocation.

4. The method of claim 3, wherein the reference and service policies represent a valid configuration when there is a service policy corresponding to each reference policy, wherein the service policy is of an identical category as the reference policy, and
when there is a service policy of a security category, then there is a corresponding reference policy of the security category.

5. The method of claim 1, wherein invoking the web service operation using the first mechanism that provides local invocation rather than the second mechanism comprises invoking a procedure call within a process that includes the first composite application and the second composite application.

6. The method of claim 1, wherein invoking the web service operation using the first mechanism that provides local invocation rather than the second mechanism comprises invoking a procedure call from instructions that implement the first composite application to instructions that implement the second composite application.

7. A system comprising:
a processor; and
a non-transitory memory configured to store a set of instructions which when executed by the processor configure the processor to:
receive a request from a first composite application to invoke a web service operation of a second composite application,
wherein the first composite application is associated with a reference policy, and the second composite application is associated with a service policy,
determine, based upon the service policy and the reference policy, whether a first mechanism that provides local invocation of the web service operation is secure, the first mechanism providing an optimized invocation of the web service compared to a second mechanism that provides invocation of the web service, wherein to determine whether the first mechanism that provides local invocation of the web service is secure the processor is configured to determine that an attribute associated with the reference policy and an attribute associated with the service policy indicate that the reference and service policies are applicable to local invocation determinations; and
invoke the web service operation using the first mechanism that provides local invocation rather than the second mechanism in response to determining that the first mechanism that provides local invocation is secure.

8. The system of claim 7, wherein to determine whether the first mechanism that provides local invocation of the web service is secure the processor is configured to determine that an attribute associated with the reference policy indicates that user authentication is needed for a local invocation determination, that an attribute associated with the service policy indicates that the service policy can be used in a local invocation determination, and that a user requesting the local invocation has been authenticated.

9. The system of claim 7, wherein to determine whether the first mechanism that provides local invocation of the web service is secure the processor is configured to determine that local invocation is secure if the reference and service policies form a valid configuration for local invocation.

10. The system of claim 9, wherein the reference and service policies represent a valid configuration when there is a service policy corresponding to each reference policy, wherein the service policy is of an identical category as the reference policy, and when there is a service policy of a security category, then there is a corresponding reference policy of the security category.

11. The system of claim 7, wherein to invoke the web service operation using the first mechanism that provides local invocation rather than the second mechanism the processor is configured to perform a procedure call within a process that includes the first composite application and the second composite application.

12. The system of claim 7, wherein to invoke the web service operation using the first mechanism that provides local invocation rather than the second mechanism the processor is configured to perform a procedure call from instructions that implement the first composite application to instructions that implement the second composite application.

13. A non-transitory machine-readable medium for a computer system, the non-transitory machine-readable medium having stored thereon a series of instructions executable by a processor, the series of instructions comprising:

instructions that cause the processor to receive a request from a first composite application to invoke a web service operation of a second composite application, wherein the first composite application is associated with a reference policy, and the second composite application is associated with a service policy;

instructions that cause the processor to determine, based upon the service policy and the reference policy, whether a first mechanism that provides local invocation of the web service operation is secure, the first mechanism providing an optimized invocation of the web service compared to a second mechanism that provides invocation of the web service; and instructions that cause the processor to invoke the web service operation using the first mechanism that provides local invocation rather than the second mechanism in response to determining that the first mechanism that provides local invocation is secure wherein the instructions that cause the processor to determine whether the first mechanism that provides local invocation of the web service is secure comprise instructions that cause the processor to determine that an attribute associated with the reference policy and an attribute associated with the service policy indicate that the reference and service policies are applicable to local invocation determinations.

14. The non-transitory machine-readable medium of claim 13, wherein the instructions that cause the processor to determine whether the first mechanism that provides local invocation of the web service is secure comprise instructions that cause the processor to determine that an attribute associated with the reference policy indicates that user authentication is needed for a local invocation determination, that an attribute associated with the service policy indicates that the service policy can be used in a local invocation determination, and that a user requesting the local invocation has been authenticated.

15. The non-transitory machine-readable medium of claim 13, wherein the instructions that cause the processor to determine whether the first mechanism that provides local invocation of the web service is secure comprise instructions that cause the processor to determine that when the reference and service policies form a valid configuration for local invocation.

16. The non-transitory machine-readable medium of claim 15, wherein the reference and service policies represent a valid configuration when there is a service policy corresponding to each reference policy, wherein the service policy is of an identical category as the reference policy, and when there is a service policy of a security category, then there is a corresponding reference policy of the security category.

17. The non-transitory machine-readable medium of claim 13, wherein the instructions that cause the processor to invoke the web service operation using the first mechanism that provides local invocation rather than the second mechanism comprise instructions that cause the processor to invoke a procedure call within a process that includes the first composite application and the second composite application.

18. The non-transitory machine-readable medium of claim 13, wherein the instructions that cause the processor to invoke the web service operation using the first mechanism that provides local invocation rather than the second mechanism comprise instructions that cause the processor to invoke a procedure call from instructions that implement the first composite application to instructions that implement the second composite application.

* * * * *

UNITED STATES PATENT AND TRADEMARK OFFICE
CERTIFICATE OF CORRECTION

Page 1 of 1

PATENT NO.      : 8,726,349 B2
APPLICATION NO. : 13/118940
DATED           : May 13, 2014
INVENTOR(S)     : Kavantzas et al.

It is certified that error appears in the above-identified patent and that said Letters Patent is hereby corrected as shown below:

In the Claims

Column 18, line 2, in Claim 13, delete "secure" and insert -- secure; --, therefor.

Signed and Sealed this
Fourteenth Day of October, 2014

Michelle K. Lee
*Deputy Director of the United States Patent and Trademark Office*